L. SOHIER.
PROCESS OF PRODUCING PRINTED COPIES OF KINEMATOGRAPHIC FILMS AND THE LIKE.
APPLICATION FILED DEC. 6, 1909.
1,028,296.
Patented June 4, 1912.
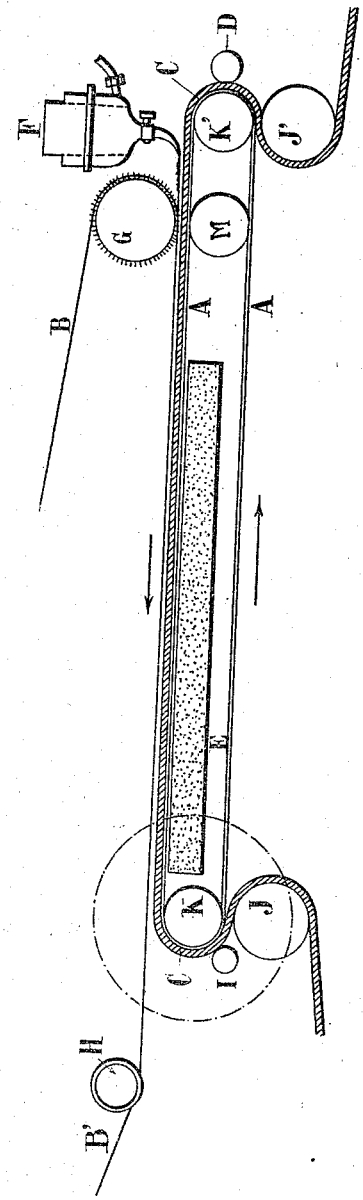
WITNESSES:
INVENTOR
Louis Sohier
BY
ATTORNEY.

UNITED STATES PATENT OFFICE.

LOUIS SOHIER, OF CHAMPIGNY-SUR-MARNE, FRANCE, ASSIGNOR TO SOCIÉTÉ SOHIER ET CIE., OF CHAMPIGNY-SUR-MARNE, SEINE, FRANCE.

PROCESS OF PRODUCING PRINTED COPIES OF KINEMATOGRAPHIC FILMS AND THE LIKE.

1,028,296.  Specification of Letters Patent.  Patented June 4, 1912.

Application filed December 6, 1909. Serial No. 531,829.

*To all whom it may concern:*

Be it known that I, LOUIS SOHIER, a citizen of the Republic of France, and resident of Champigny-Sur-Marne, Seine, France, have invented new and useful Improvements in Processes of Producing Printed Copies of Kinematographic Films and the Like, which improvements are fully set forth in the following specification.

A process of producing printed copies of kinematographic films or the like on celluloid or other material is already known.

The process in question is, briefly, as follows:—1. The casting on to a plate in relief of gelatin of a solution of celluloid or any other plastic material, the said solution being covered, as soon as it is dry, with a plate of celluloid or any other material; or the application to the said plate in relief of a plate of celluloid or any other plastic material, which, being in either case pressed on hot, produce a counter type in relief. 2. The use of the said counter type in relief as the movable plate of indefinite length, from which continuous printing can be effected by means of a rotary machine.

This invention has first of all for its object to provide a method whereby the movable plate just mentioned, can also be obtained by plaster molding and by countermolding in celluloid or any other plastic material, by means different from that used in the process described. Thus, instead of pouring on the reliefs in gelatin a solution of celluloid or of any other plastic material, it is possible: either to mold in plaster the reliefs developed in water or mold also in plaster the reliefs obtained by swelling.

For carrying out the counter molding, it is then sufficient to pour into the plaster molding celluloid or any other plastic material, all by well known means. It must be pointed out that, if it is desired to produce a counter-mold in hot state, in celluloid or in any other plastic material, with reliefs obtained by swelling, it is necessary to do the molding in plaster in a vacuum.

By the use of plaster moldings, a quick and perfect drying of the plastic material is obtained, the solvent being absorbed very quickly in its bottom portion by the mass of plaster. This does not take place when celluloid or any other plastic material is poured onto a plate made of copper or any other metal, as the solvent of the underlying layer cannot be absorbed by the said metal. Moreover, these means naturally obviate any warping and deformation of the plate after the de-counter molding.

In the process hereinbefore recalled, the rotary machine was constituted by two feed rolls connected in pairs by metal bands. The movable plate, after having received the transparent ink and after having been covered with virgin celluloid or any other plastic material, was carried between the two metal bands into the rolls. During the passage between the two cylinders, the film, held in contact with a movable plate owing to the two metal bands, was dried by means of a refrigerating mixture.

In the present invention, the upper metal band is not employed and two fly wheels are substituted for the four rolls connected in pairs. The contact is made, and the impression obtained, by means of a wheel with points, which forms at the same time the pressure and the ink spreading roller. The ink is supplied in the quantity desired by a suitable automatic ink pot arranged in front of the wheel with points.

The way in which the impression is effected, will be readily understood with the assistance of the accompanying drawing given merely by way of example.

The movable perforated plate C, the length of which can vary to suit the subject to be reproduced, is introduced between the pressure roller J' and the fly wheel K'. The plate in question, after having been oiled by the automatic lubricating device D and the surface thus rendered somewhat greasy, passes under the automatic ink pot or fountain F, which distributes ink over the surface thereof. The inked plate then passes between the roller G and the roller M, together with the film B to be printed, and the impression is thereby produced on the film, the pressure of the rollers serving at the same time to force the ink from the raised portion of the printing plate into the hollows thereof, this action being facilitated by virtue of the plate being oily. Therefore the design is really printed by the depressed portions of the plate, the ink being all squeezed off of the relief portions thereof. The points of the wheel engage with the perforations of the movable plate, the contact is established with a perfect accuracy and the impression is effected. The movable plate and the film, carried afterward in the direction of the arrow, pass over the refrigerating mixture contained in the chamber E, and it is during that passage that the solidification of the ink (colored gelatin) takes place. On arriving at the fly wheel K, the film is separated from the movable plate C and winds itself on the drum at B', while the movable plate, continuing its travel on the metal band A, passes in its turn between the fly wheel K and the pressure roller J. The device is completed by a roller H guiding the printed film, and by an automatic wiping device I.

Claim.

The herein described process of producing printed copies of kinematographic films and the like, which consists in the following steps; first, forming from the original film a gelatin plate in relief; second, molding from such plate, by means of a matrix of plaster or the like, a flexible printing band of plastic material such as celluloid; third, supplying consecutively oil and then a gelatinous ink to the printing surface of such band; and, fourth, pressing firmly the inked surface of such printing band against the film to be printed, such pressure serving to simultaneously spread the ink and produce the impression.

In testimony whereof I have signed this specification in the presence of two subscribing witnesses.

LOUIS SOHIER.

Witnesses:
EMILE LEDRET,
H. C. COXE.